Sept. 6, 1966  R. D. BARRETT ETAL  3,270,830
VEHICLE WIDE TREAD AXLE SUPPORT
Filed June 29, 1964

INVENTORS
ROBERT D. BARRETT
GEORGE J. HAMOUZ
LAWRENCE I. FRISBIE
JAMES K. HIRAKAWA
EDWARD C. HARNACH, JR.

ATTORNEY

United States Patent Office 3,270,830
Patented Sept. 6, 1966

3,270,830
VEHICLE WIDE TREAD AXLE SUPPORT
Robert D. Barrett, Westchester, George J. Hamouz, Clarendon Hills, Lawrence I. Frisbie, La Grange, James K. Hirakawa, Chicago, and Edward C. Harnach, Jr., La Grange Highlands, Ill., assignors to International Harvester Company, Chicago, Ill., a corporation of New Jersey
Filed June 29, 1964, Ser. No. 378,905
2 Claims. (Cl. 180—88)

The invention relates in general to vehicles and, more particularly, to the adjustment of tread of tractors and other vehicles.

Although a vehicle wide tread axle support is described herein in connection with the usual type of agricultural or industrial tractor, it is to be understood that this invention readily applies to vehicles of various types.

Such tread extension, and support thereof, is desirable so that tractors or other vehicles may be adapted to travel through rows of crops or like applications with wheels at different lateral distances apart.

Previously, tractors and other vehicles equipped with long or extended axles which axles by virtue of such length bear severe stresses and strains have often sustained fractures in such axles due to undistributed stresses and strains, and such fractures have resulted in reduced efficiency, inconvenience, time loss, increased labor costs, and crop loss, to the agricultural or other operation. Previous methods of lengthening or extending axles to obtain wider tread, and the proper support thereof, have been accomplished by a variety of methods, such as threaded axles, coupling of splined stub axle with the main axle, and by other methods, such methods usually requiring a great number of component parts and great effort for changing the tread.

For many years it has been realized that tractor performance has been deficient insofar as adaptability to variation in crop row spacing is concerned. Although methods have been developed to provide for adjustments in wheel tread to accommodate crop row spacing, such methods resulted in elongated axles with insufficient means for providing and distributing the support required to avoid fractures.

An important object of the invention is to facilitate the extension of the tread of a tractor or other vehicle.

A further object of the invention is to provide means for distributing the severe stresses and the bending strains which often develop in axles when in a condition of wide tread, and attendant thereto, additionally providing means for reducing axle fractures.

A still further object of the invention is to provide means for displacing an outboard axle bearing and redistributing support in those areas where the axle is subjected to the most severe stresses and strains.

Still another object of the invention is to provide an increase in tread by extending a vehicle axle and providing means to support said extension to enable the vehicle wheels to be mounted at a desired spacing from their conventional position while requiring a minimum of changes in the vehicle, and associated components such as the wheels, the brake drum or the wheel mountings.

Other objects and a fuller understanding of the invention may be had by referring to the following description and claims taken in conjunction with the accompanying drawings in which:

Figure 1:
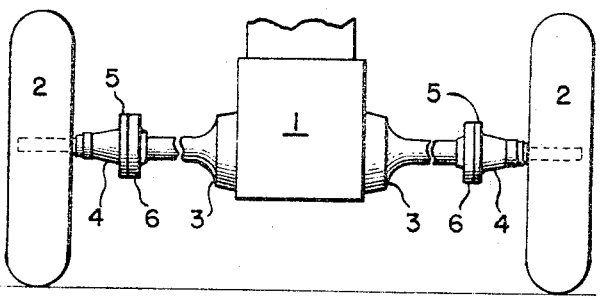
FIGURE 1 shows a rear elevational view of a portion of an agricultural tractor vehicle in which the present invention is incorporated.

The tractor in FIGURE 1 is typical of such vehicles which operate on farms throughout the U.S.A. and elsewhere in the world. It has the tractor body 1 with rear wheels 2 in place in position to provide the wide tread therefor.

Figure 2:
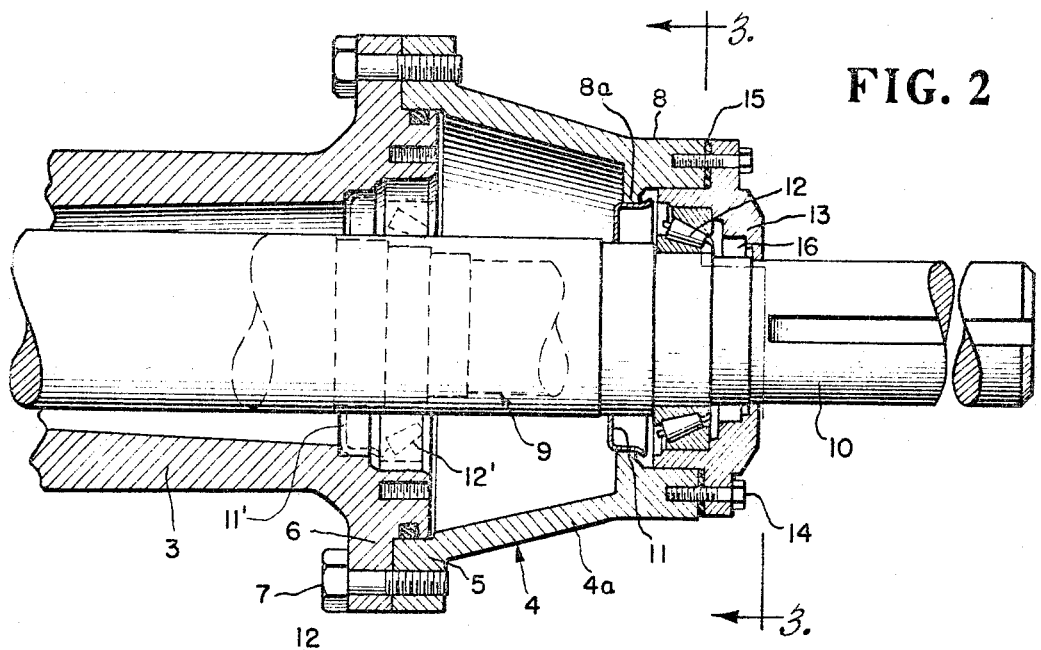
FIGURE 2 shows a rear elevational view of a portion of the rear drive and axle assembly of a tractor incorporating the proposed invention with portions of the bearing and extension housing being shown in section.
Figure 3:
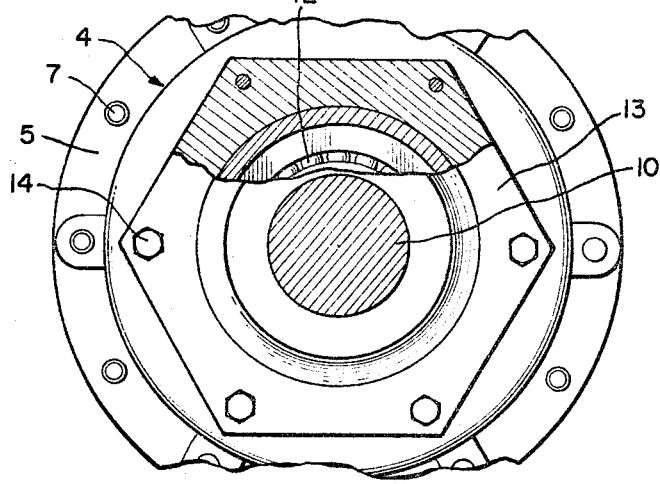
FIGURE 3 shows an end elevational view with a portion thereof in section taken generally along the line 3—3 of FIGURE 2.

A rear axle assembly of the kind to which the present invention is especially applicable is fragmentarily illustrated in FIGURE 2 and in part in FIGURE 1.

It comprises a rear axle housing 3 having a flange 6 and having provision for securing of retainer 11', bearings 12' and rear axle housing cap (not shown) while narrow tread is used.

This invention provides a support device consisting of a flanged housing extension 4, the inner end of which extension is formed so as to constitute a flange 5. This flange is of diameter and formation to abut directly against the outer surface of the flange 6 on the outer end of axle housing 3. Threaded holes in said flange 5 are so spaced as to provide firm attachment to the axle housing by cap screws 7. The body of the housing extension 4 consists of a wall 4a connecting said flange 5 at the inner end and an outer end portion 8 having a reduced diameter opening 8a therein in which is positioned grease retainer 11, said body portion being so fashioned as to constitute a frusto-conical shape. The length of the body portion of the flanged housing extension 4, is such that the neck 8 is in position a desired distance beyond the said rear axle housing 3 as shown in FIGURE 2.

To install the flanged housing extension 4 and associated components for use in wide tread position, the following parts provided in the assembly for use with the narrow tread condition, are removed, a shorter rear axle shaft 9 and a grease retainer 11', and an anti-friction bearing 12' shown in broken lines in FIGURE 2 along with the shims, oil seal, and carrier cap (not shown). Next the housing extension 4 is secured by housing extension flange 5 to rear axle housing flange 6 by cap screws 7.

A longer rear axle 10 is then fitted into the housing 3, then grease retainer 11, bearings 12 and shims 15 and oil seal 16 are placed, and then with placement of rear axle housing cap 13 and cap screws 14 and tightening of same, the said body structure will have been secured in position for wide tread service.

This invention, embodying as it does, the housing extension, is capable of being readily fastened to a conventional assembly housing and, therefore, constitutes a practicable attachment. It affords to the operator of a tractor of conventional tread the benefit of an extension in tread.

Inasmuch as the installation does not involve permanent modification of the tractor equipment or parts, the removal of the attachment, and the return to the standard axle length is practicable.

Whereas the description and drawings refer to a tractor rear axle housing, the invention is applicable to axle assemblies generally which embody a central housing. It is also to be understood that minor variations may be made in the structural features of the invention without departing from the principle thereof.

What is claimed is:

1. In a vehicle comprising a body and an axle housing projecting outwardly from said body for selective reception of axles which are relatively short and long, said housing having an outboard end portion, the combination of: housing extension mounting means on said housing outboard end portion, a first bearing assembly mounting means on said housing outboard end portion, a bearing assembly mountable on the bearing assembly mounting means to receive and journal the shorter of said axles received by the axle housing, an axle housing extension having outer and inner end portions and having an opening therethrough and fashioned with a frusto-conical shape therebetween, said inner end portion being detachably secured by said housing extension mounting means to mount the housing extension on the axle housing with the outer end portion of the extension disposed outwardly from the outboard end portion of the axle housing, an axle housing cap having an axially extending aperture therethrough, said axle housing cap having an integral, circumferentially and axially inwardly extending wall for supportably mounting said bearing assembly therein to receive and journal the longer of said axles when the housing extension is mounted on the axle housing and when the longer axle is disposed in the axle housing, said axle housing cap including a radially outwardly extending flange, and means detachably securing said latter flange to the outer end portion of said housing extension.

2. In a vehicle comprising a body and an axle housing projecting outwardly from said body for selective reception of axles which are relatively short and long, said housing having an outboard end portion, the combination of: housing extension mounting means on said housing outboard end portion, a first bearing assembly mounting means on said housing outboard end portion, a bearing assembly mountable on the bearing assembly mounting means to receive and journal the shorter of said axles received by the axle housing, an axle housing extension having outer and inner end portions and having an opening therethrough and fashioned with a frusto-conical shape therebetween, said inner end portion being detachably secured by said housing extension mounting means to mount the housing extension on the axle housing with the outer end portion of the extension disposed outwardly from the outboard end portion of the axle housing, an axle housing cap having an axially extending aperture therethrough, said axle housing cap having an integral, circumferentially and axially inwardly extending wall dimensioned for close fit formation within said housing extension for supportably mounting said bearing assembly therein to receive and journal the longer of said axles when the housing extension is mounted on the axle housing and when the longer axle is disposed in the axle housing, said axle housing cap including a radially outwardly extending flange, and means detachably securing said latter flange to the outer end portion of said housing extension.

References Cited by the Examiner
UNITED STATES PATENTS

| | | | |
|---|---|---|---|
| 1,648,076 | 11/1927 | Stripling | 180—75 |
| 1,990,344 | 2/1935 | Newhouse | 180—75 |
| 2,400,505 | 5/1946 | Hedglen. | |
| 2,819,117 | 1/1958 | Glazier | 301—128 |
| 3,170,704 | 2/1965 | Broadshaw | 180—88 |

A. HARRY LEVY, *Primary Examiner.*